Patented July 31, 1951

2,562,715

UNITED STATES PATENT OFFICE 2,562,715

EXTRACTION OF PENICILLIN

Charles W. Heathcote, Jr., and Granville R. Rettew, West Chester, Pa., assignors to Wyeth Incorporated, Philadelphia, Pa., a corporation of Delaware No Drawing. Application February 26, 1944, Serial No. 524,144

12 Claims. (Cl. 260—239.1)

This invention pertains to the extraction of penicillin from crude broths containing the same, and particularly pertains to a method of hastening the separation of the organic solvent layer containing the penicillin from the aqueous broth layer during the process of extraction.

In the production of penicillin, it is now customary to extract the penicillin from its crude broth culture medium by means of a water-immiscible organic solvent such as amyl acetate or chloroform. This extraction serves not only to concentrate and purify the penicillin but also serves to transfer the penicillin to an environment in which the penicillin is more stable. To extract the penicillin effectively it is necessary that the water-immiscible organic solvent be agitated thoroughly and rather vigorously with the crude broth culture medium. Unfortunately such agitation generally results in the aqueous and organic solvent layers forming a persistent emulsion that "breaks" into two layers extremely slowly; in fact sometimes even after prolonged standing an emulsion interphase persists between the two layers. Such a condition is undesirable both from the standpoint of slowing down the production of penicillin and also from the standpoint of loss of penicillin because of incomplete separation of the aqueous layer.

One object of the present invention is to facilitate the extraction of penicillin from its crude broth culture medium.

Another object of the invention is to speed up the production of penicillin without increasing the amount of production equipment required.

A specific object of the invention is to "break" more quickly into separate layers the emulsion that forms when a water-immiscible organic solvent is agitated vigorously with the crude culture broth containing the penicillin.

A more specific object of the invention is to furnish an agent that in small amounts is without harmful effect on the penicillin but that is effective in "braking" more quickly into separate layers the emulsion that forms when a water-immiscible organic solvent is agitated vigorously with the crude culture broth containing the penicillin.

We have found that the addition of a small amount of an emulsifying agent surprisingly achieves the above objectives and others that will become apparent hereinafter in the specification. Emulsifying agents of the type capable of producing oil-in-water emulsions and of lowering the surface tension of water even in the presence of acid are especially useful in promoting a quick "break" of the emulsion to form two sharply defined layers consisting of an organic solvent layer containing extracted penicillin and an aqueous layer from which the penicillin has been extracted. Preferred agents of such a type are the sulfated high alcohols sold in commerce under the trade names "Duponol" OS, "Duponol" ME, "Tergitol #7" (sodium sulfate derivative of 3.9-diethyltridecanol-6); and "Tergitol" #4. Another preferred agent is "Alkanol" WXN which is the sodium salt of a higher petroleum aliphatic hydrocarbon sulfonate. A great variety of emulsifying agents, however, may be used successfully to speed the "breaking" of the emulsion into two sharply defined layers. Thus there may be mentioned soaps, such as the ammonium soap of cocoanut oil fatty acids and sold under the trade name of "Wecoline" A, or triethanolamine oleate (either in proportions of one to one of triethanolamine and oleic acid or in proportions of one to two). In the claims the expression "ammonium soaps" is intended to include substituted ammonium soaps such as triethanolamine soaps. Likewise, one may use sulfonated esters of succinic acid, such as that sold in the trade under the name of "Aerosol" OT (sulfonated octyl ester of succinic acid). Or as the emulsifying agent one may add a condensation product of formaldehyde and naphthalene sulfonic acid sold under the name of "Tanasol" PW. Other suitable emulsifying agents are "Emulphor" A, Turkey red oil and "Product Q" which is cetyl trimethyl ammonium bromide. In the claims where sulfonated compounds or sulfates are claimed, it is intended to include the water-soluble salts of these compounds such as, for example, the sodium salts.

We have further found that the amount of emulsifying agent necessary to produce the desired result is critically important for each emulsifying agent selected and that the amount in each case must be experimentally determined. That is to say, if one adds too little of the emulsifying agent no appreciable improvement in "breaking" the emulsion into two layers is achieved, while if too much emulsifying agent is added the emulsification difficulties are augmented rather than decreased. Thus in the case of "Tergitol #7" we have found that about .05 cc. to 1.0 cc. per liter of amyl acetate produces satisfactory results while much less or much greater amounts of the "Tergitol #7" are ineffective.

The following table serves to illustrate specifically the effectiveness of typical emulsifying agents. In securing these data, a crude culture broth containing penicillin was cooled to 2° to 4° C., filtered through cheese cloth, and acidified to a pH of 2.2–2.4 with 10% phosphoric acid. For each test 10 cc. of the cold, filtered, and acidified broth were placed in a 25 cc. stoppered graduated cylinder together with 7.5 cc. of amyl acetate and the requisite amount of emulsifying agent. In the case of the Control, .5 cc. of water was added to compensate to a degree for the volume added to the other tests in the form of emulsifying agents. After shaking all tests the same length of time to form emulsions, readings were taken at time intervals of 5, 10 and 15 minutes of the volumes of the clarified aqueous portions of the emulsions.

Table I

| Emulsifying Agent, .1% Solutions | Volume of clear aqueous liquid separated from Emulsion after standing— | | |
|---|---|---|---|
| | 5 min. | 10 min. | 15 min. |
| | Cc. | Cc. | Cc. |
| Control | 1.5 | 3.5 | 5.0 |
| "Tergitol" #7—.5 cc. | 3.25 | 5.5 | 6.5 |
| "Alkanol" WXN— | | | |
| .5 cc. | 2.0 | 3.5 | 5.0 |
| 1.0 cc. | 6.0 | 7.5 | 8.0 |
| 10% Alum—1 drop | 1.5 | 2.5 | 4.5 |
| "Tergitol" #7 .5 cc. and 10% Alum 1 drop. | 4.5 | 6.5 | 7.5 |
| "Product Q"—.5 cc. | 5.0 | 6.5 | 7.25 |
| "Aerosol" OT— | | | |
| .25 cc. | 1.75 | 4.0 | 5.5 |
| .50 cc. | 1.75 | 5.00 | 6.25 |
| 1.0 cc. | 5.75 | 7.00 | 7.75 |
| "Emulphor" A—.5 cc. | 4.00 | 5.5 | 6.25 |
| "Wecoline" A— | | | |
| .5 cc. | 1.00 | 2.5 | 4.5 |
| 2.5 cc. | 1.5 | 4.0 | 6.0 |
| "Tanasol" PW—1 cc. | 5.5 | 7.0 | 7.5 |
| "Duponol" ME—1 cc. | 3.25 | 5.5 | 6.5 |
| Triethanolamine 1 pt. and Oleic Acid 2 pts.— | | | |
| .75 cc. | 2.5 | 4.5 | 6.25 |
| 1.00 cc. | 2.5 | 5.0 | 6.25 |
| 2.25 cc. | 2.5 | 5.25 | 7.0 |
| Triethanolamine 1 pt. and Oleic acid 1 pt.—2.0 cc. | 3.0 | 5.5 | 7.0 |

The type, manufacturer or distributor, and chemical characterization of the emulsifying agents used are indicated in the following table:

Table II

| Name of Agent | Kind of Agent | Manufacturer or Distributor | Chemical Composition |
|---|---|---|---|
| Tergitol #7 | Anionic | Carbide & Carbon Chem. Corp. | Sodium salt of sulfated 3,9-diethyltridecanol-6. |
| Alkanol WXN | do | E. I. du Pont de Nemours & Co. | Sodium salt of a higher petroleum aliphatic hydrocarbon sulfonate. |
| Product Q | Cationic | do | Trimethyl cetyl ammonium bromide. |
| Aerosol OT | Anionic | American Cyanamid & Chem. Corp. | Dioctyl ester of sodium sulfo-succinic acid. |
| Emulphor A | Non-ionic | General Dyestuff Corp. | Higher fatty poly ethers of the formula: $R-COO(CH_2CH_2O)_nCH_2CH_2OH$ |
| Wecoline A | Anionic | Wecoline Products, Inc. | A fractionated cocoanut oil, rich in lauric acid. During fractionation most of the lower boiling compound fatty acids have been removed. |
| Tanasol PW | do | Jacques Wolfe & Co. | Sodium salt of di-sulfo di-naphthyl methane. |
| Duponol ME | do | E. I. du Pont de Nemours & Co. | Sodium lauryl sulfate. |

Or described somewhat differently, at the end of the five, ten and fifteen minute periods, 54.5%, 68%, and 73% of the aqueous layers had sharply separated from the amyl acetate layer in the case wherein 1.0 cc. of "Alkanol" WXN had been used as compared to 14.3%, 33.2%, and 47.5%, respectively, in the case of the Control. While the above data are given on the basis of small scale experiments, a corresponding and sometimes greater improvement is obtained when the emulsifying agents are added in the same proportion in extracting plant size batches of the crude penicillin broth.

As will be noted from Table I above, the action of the emulsifying agents may be enhanced by the addition of a small amount of an electrolyte, for instance, that of "Tergitol No. 7" by adding a drop of 10% alum solution. Other electrolytes, preferably of the polyvalent type, are useful for the same purpose.

We prefer to carry out the extraction of the crude penicillin culture broth with amyl acetate. Emulsification difficulties are encountered also, however, in the case of other suitable organic solvents, such as chloroform, ethylene dichloride, butyl acetate, ethers, and water-immiscible ketones, such as diisopropyl ketone. In such cases, the separation of the emulsion into two sharply defined layers of aqueous solution and organic solvent extract may be hastened by the presence of a small amount of an emulsifying agent. Thereafter the two layers may be separated in any desirable conventional manner or if desired the emulsion may be passed directly through a Sharples Super Centrifuge to separate off the organic solvent extract layer without waiting for layer formation to occur. If the latter procedure is followed, the separation of the organic solvent extract proceeds much more smoothly in the presence of the emulsifying agent that in its absence.

Almost every type of crude penicillin culture liquids gives rise to emulsification difficulties and in all such cases the teachings of the present invention may be applied with advantage. As typical penicillin crude culture media may be mentioned the Modified Czapek-Dox consisting of .5 gm. hydrated magnesium sulfate, 3 gm. of sodium nitrate, 1 gm. of potassium dihydrogen phosphate, .5 gm. potassium chloride, .01 gm. of hydrated ferrous sulfate, 40 gm. of glucose, and water sufficient to make one liter, or a medium consisting of 40 cc. of corn steep liquor, 30 gm. of lactose, 3 gm. of sodium nitrate, .5 gm. of primary potassium phosphate, .01 gm. of zinc sulfate, .25 gm. of hydrated magnesium sulfate, and water sufficient to make one liter. For convenience the invention has also been described in terms of extracting a crude penicillin broth culture. However the addition of emulsifying agents is generally applicable to minimize difficulties wherever liquid containing penicillin has a tendency to form an emulsion during extraction. For instance, sometimes the crude penicillin broth culture is treated with Darco-G-60 or similar adsorbent carbon black to adsorb the penicillin, the carbon adsorbate eluted with amyl acetate and water, and the eluate extracted with amyl acetate. In such cases emulsion difficulties are likewise encountered and the "breaking" of the emulsion may be accomplished by the addition of a small amount of emulsifying agent.

The demulsification activity shown by emulsifying agents upon the emulsion resulting from mixing a water-immiscible organic solvent with a crude penicillin broth culture is rather remarkable and difficult to explain. One possible explanation is that the added emulsifying agent reacts with the polyvalent electrolyte present in the crude culture penicillin broths to form a compound that nullifies not only the emulsifying character of the added emulsifying agent but also the emulsifying character of the unknown emulsifying agent inherently present in the crude penicillin culture broth.

As many apparently widely different embodiments of this invention may be made without departing from the spirit and scope thereof, it is to be understood that we do not limit ourselves to the above description except as defined in the appended claims.

We claim:

1. In the process of extracting penicillin from a crude acidic aqueous culture liquid with a water-immiscible organic solvent, the improvement which comprises adding thereto, as a demulsifier, a small amount of an emulsifying agent substantially inert to penicillin and having the properties of reducing the surface tension of water and promoting the formation of oil-in-water emulsions in aqueous media having an acid reaction, said emulsifying agent consisting essentially of a material from the group consisting of (1) higher alcohol sulfates, (2) sulfonated higher hydrocarbons, (3) higher alkyl esters of sulfosuccinic acid, (4) long-chain-alkyl tri-lower-alkyl quaternary ammonium halides, and (5) ammonium soaps of higher fatty acids, thus accelerating separation of the organic solvent extract from the aqueous phase, and separating the resulting organic solvent extract from the aqueous phase.

2. The process steps defined in claim 1 in which the extraction is carried out at a pH of substantially 2.

3. The process steps defined in claim 1 in which the emulsifying agent is added in an amount within the range 0.003% to 0.1% by weight of the amount of organic solvent employed.

4. In the process of extracting penicillin from a crude acidic aqueous culture liquid with a water-immiscible organic solvent, the improvement which comprises adding thereto, as a demulsifier, a small amount of an emulsifying agent having the properties of reducing the surface tension of water and promoting the formation of oil-in-water emulsions in aqueous media having an acid reaction, said emulsifying agent consisting essentially of an alkali metal salt of a higher alkyl sulfate, thus accelerating separation of the organic solvent extract from the aqueous phase and separating the resulting organic solvent extract from the aqueous phase.

5. In the process of extracting penicillin from a crude acidic aqueous culture liquid with a water-immiscible organic solvent, the improvement which comprises adding thereto a small amount of the sodium salt of the sulfate of 3,9-diethyl tridecanol-6, as a demulsifier, and separating the resulting organic solvent extract from the aqueous phase.

6. In the process of extracting penicillin from a crude acidic aqueous culture liquid with a water-immiscible organic solvent, the improvement which comprises adding thereto, as a demulsifier, a small amount of an emulsifying agent having the properties of reducing the surface tension of water and promoting the formation of oil-in-water emulsions in aqueous media having an acid reaction, said emulsifying agent consisting essentially of sulfonated higher petroleum hydrocarbon, thus accelerating separation of the organic solvent extract from the aqueous phase and separating the resulting organic solvent extract from the aqueous phase.

7. In the process of extracting penicillin from a crude acidic aqueous culture liquid with a water-immiscible organic solvent, the improvement which comprises adding thereto, as a demulsifier, a small amount of an emulsifying agent having the properties of reducing the surface tension of water and promoting the formation of oil-in-water emulsions in aqueous media having an acid reaction, said emulsifying agent consisting essentially of di-sulfo di-naphthyl methane, thus accelerating separation of the organic solvent extract from the aqueous phase and separating the resulting organic solvent extract from the aqueous phase.

8. In the process of extracting penicillin from a crude acidic aqueous culture liquid with a water-immiscible organic solvent, the improvement which comprises adding thereto a small amount of dioctyl ester of sodium sulfo-succinic acid as a demulsifier, and separating the resulting organic solvent extract from the aqueous phase.

9. In the process of extracting penicillin from a crude acidic aqueous culture liquid with a water-immiscible organic solvent, the improvement which comprises adding thereto, as a demulsifier, a small amount of an emulsifying agent substantially inert to penicillin and having the properties of reducing the surface tension of water and promoting the formation of oil-in-water emulsions in aqueous media having an acid reaction, said emulsifying agent consisting essentially of a long-chain-alkyl tri-lower-alkyl ammonium halide, thus accelerating separation of the organic solvent extract from the aqueous phase, and separating the resulting organic solvent extract from the aqueous phase.

10. In the process of extracting penicillin from a crude acidic aqueous culture liquid with a water-immiscible organic solvent, the improvement which comprises carrying out the extraction in the presence of a small amount of a long-chain-alkyl trimethyl ammonium bromide, as a demulsifier, thus accelerating separation of the organic solvent extract from the aqueous phase, and separating the resulting organic solvent extract from the aqueous phase.

11. In the process of extracting penicillin from a crude acidic aqueous culture liquid with a water-immiscible organic solvent, the improvement which comprises carrying out the extraction of the acidic aqueous culture liquid at a pH of about 2 and in the presence of a small amount of a long-chain-alkyl trimethyl ammonium bromide as a demulsifier, thus accelerating separation of the organic solvent extract from the aqueous phase, and separating the resulting organic solvent extract from the aqueous phase.

12. In the process of extracting penicillin from a crude acidic aqueous culture liquid with a water-immiscible organic solvent, the improvement comprising adding thereto about .1% of a long-chain-alkyl trimethyl ammonium bromide, as a demulsifier, and separating the resulting organic solvent extract from the aqueous phase.

CHARLES W. HEATHCOTE, Jr.
GRANVILLE R. RETTEW.

(References on following page)

REFERENCES CITED

The following references are of record in the file of this patent:

UNITED STATES PATENTS

| Number | Name | Date |
|---|---|---|
| 1,938,322 | De Groote | Dec. 5, 1933 |
| 1,938,323 | De Groote | Dec. 5, 1933 |
| 1,943,815 | De Groote | Jan. 16, 1934 |
| 2,262,238 | De Groote | Nov. 11, 1941 |
| 2,262,741 | De Groote | Nov. 11, 1941 |
| 2,281,419 | De Groote | Apr. 28, 1942 |
| 2,338,384 | Robinson | Jan. 4, 1944 |
| 2,448,790 | Foster et al. | Sept. 7, 1948 |

OTHER REFERENCES

Report of Investigations, Dept. of Interior Bureau of Mines, Serial No. 2,692, June 1925, Physical Chemistry of Oil Field Emulsions, pp. 7 and 8.

Proceedings of World Petroleum Congress, London (1933), p. 519.

Condensed Dictionary, page 51, 3rd ed., 1942.

Synthetic Organic Chemicals, by Union Carbon and Carbide, 11th ed., July 1, 1942, p. 62.

Theory of Emulsions, 4th ed., 1943, pp. 475–480.